United States Patent
Bara et al.

(10) Patent No.: US 8,550,258 B2
(45) Date of Patent: Oct. 8, 2013

(54) FEEDWELL FOR A GRAVITY SEPARATION VESSEL

(75) Inventors: Barry Bara, Edmonton (CA); Jonathan Spence, Edmonton (CA); Jim Lorentz, Fort McMurray (CA); Trevor Lloyd Hilderman, Port Coquitlam (CA); Chadwich Robert Larson, Vancouver (CA); Darwin Edward Kiel, New Westminster (CA)

(73) Assignee: Syncrude Canada Ltd., Fort McMurray (CA), In trust for the owners of the Syncrude Project as such owners exist now and in the future ( * ) Notice: Subject to any disclaimer, the term of this patent is extended or adjusted under 35 U.S.C. 154(b) by 243 days.

(21) Appl. No.: 12/881,816

(22) Filed: Sep. 14, 2010

(65) Prior Publication Data

US 2011/0062090 A1    Mar. 17, 2011

Related U.S. Application Data

(60) Provisional application No. 61/242,265, filed on Sep. 14, 2009.

(51) Int. Cl.
   *B01D 21/24*    (2006.01)
   *B01D 21/00*    (2006.01)
(52) U.S. Cl.
   CPC ........ *B01D 21/2405* (2013.01); *B01D 21/0087* (2013.01)
   USPC ...................................... 210/519; 210/532.1

(58) Field of Classification Search
   USPC ....................... 210/519, 521, 528, 532.1, 801
   See application file for complete search history.

(56) References Cited

U.S. PATENT DOCUMENTS

| | | | |
|---|---|---|---|
| 4,014,791 A * | 3/1977 | Tuttle ............................ | 210/519 |
| 4,038,186 A * | 7/1977 | Potter et al. ................... | 210/519 |
| 5,944,995 A | 8/1999 | Sethi et al. | |
| 6,966,985 B2 * | 11/2005 | Schoenbrunn et al. ....... | 210/519 |
| 7,235,182 B2 * | 6/2007 | Taylor et al. .................. | 210/528 |
| 7,981,299 B2 * | 7/2011 | Triglavcanin et al. ........ | 210/519 |
| 2005/0211607 A1 * | 9/2005 | Armbruster ................... | 210/521 |
| 2009/0173701 A1 * | 7/2009 | Egan, III ....................... | 210/519 |
| 2010/0187191 A1 * | 7/2010 | Triglavcanin ................. | 210/519 |

OTHER PUBLICATIONS

Fitch, E.B. and Lutz, W.A. Feedwells for Density Stabilization. Journal (Water Pollution Control Federation). 1960. vol. 32(2), pp. 147-156.

(Continued)

*Primary Examiner* — Christopher Upton
(74) *Attorney, Agent, or Firm* — Bennett Jones LLP

(57) ABSTRACT

A feedwell for a gravity separation vessel for introducing a feed stream such as oil sand slurry to the gravity separation vessel is provided comprising a walled member having an upper perimeter edge, a lower perimeter edge and a substantially continuous wall extending from the upper perimeter edge to the lower perimeter edge; an inlet for introducing the feed stream into the walled member positioned adjacent the substantially continuous wall; and a bottom floor having an opening and extending generally beneath the lower perimeter edge; whereby a perimeter of the opening is less than a perimeter of the walled member.

11 Claims, 6 Drawing Sheets

(56) References Cited

OTHER PUBLICATIONS

Krebs, P., et al. Inlet-Structure Design for Final Clarifiers. Journal of Environmental Engineering. 1995. vol. 121(8), pp. 558-564.

Masliyah, J., et al. Theoretical and Experimental Studies of a Gravity Separation Vessel. Industrial & Engineering Chemistry Process Design and Development. 1981. vol. 20, pp. 154-160.

Tyler, J., et al. The Use of Physical Modeling in the Optimisation of a Primary Separation Vessel Feedwell. The Canadian Journal of Chemical Engineering. 2009. vol. 87(6), pp. 821-831.

Wang, M., et al. Hydrodynamics in a Gravity Settling Vessel: CFD Modelling with LDA Validation. The Canadian Journal of Chemical Engineering. 2000. vol. 78, pp. 1046-1055.

White, R.B., et al. Fluid Flow in Thickener Feedwell Models. Minerals Engineering. 2003. vol. 16, pp. 145-150.

\* cited by examiner

_US 8,550,258 B2_

FEEDWELL FOR A GRAVITY SEPARATION VESSEL

This application claims priority to U.S. provisional patent application No. 61/242,265 filed Sep. 14, 2009.

FIELD OF THE INVENTION

The present invention relates to gravity separation vessels, in particular, those used for separating bitumen from an oil sand/water slurry and, more particularly, to the introduction of a slurry to a gravity separation vessel.

BACKGROUND OF THE INVENTION

Bitumen extracted from oil sand, such as oil sand mined in the Fort McMurray region of Alberta, is generally made up of water-wet sand grains and viscous bitumen. To eventually produce a commercial petroleum product from oil sand, the bitumen must be removed from the sand. To remove the bitumen from the sand/bitumen mixture, the oil sand is often crushed and then mixed with water to form an oil sand/water slurry. This slurry can then be subjected to what is commonly referred to as "pipeline conditioning" by pumping the slurry some distance through a pipeline, commonly called a hydrotransport pipeline. The conditioned slurry is then typically diluted with a fluid, such as water, to form a diluted slurry. By diluting the slurry, the density of the slurry can be altered to a more desirable density for separation of the bitumen in the slurry. The diluted slurry is then fed to a gravity separation vessel such as a primary separation vessel (PSV) where the relatively quiescent conditions and entrained air in the bitumen allows a significant portion of the bitumen to float towards the top of the gravity separation vessel and collect in a layer of froth, commonly called primary bitumen froth. This primary bitumen froth can be recovered and further treated to eventually be made into a commercial petroleum product.

In addition to the bitumen froth layer, typically a middlings layer and a tailings layer are also formed in the gravity separation vessel. The middlings layer forms below the bitumen froth layer and the tailings layer forms at the bottom of the gravity separation vessel. The middlings and tailings layers are removed and often further treated to extract out additional bitumen that remains in these layers. However, the bitumen in these layers is not as easily recoverable.

To try and increase the quality of the bitumen froth that collects in the bitumen froth layer, an underwash layer is often purposely formed above the middlings layer and below the bitumen froth layer in the PSV. The underwash layer is typically formed by introducing heated liquid, such as water, to the upper portion of the middlings layer and below the bitumen froth layer. The heated liquid in the underwash layer can help to increase the temperature of the bitumen froth produced. The heated underwash water can also replace the middlings in the bitumen froth as it is formed, thereby reducing the amount of solids in the froth.

To enhance gravity separation, quiescent conditions need to be maintained in the PSV. One of the main factors affecting these quiescent conditions is the introduction of the slurry to the gravity separation vessel. Typically, these gravity separation vessels are operated as a continuous process with slurry continuously being introduced into the gravity separation while end products, such as bitumen froth, a tailings stream, etc. are continuously being removed from the gravity separation vessel. The introduction of slurry can have a detrimental effect on these quiescent conditions due to the high velocity of the feed and the recirculation currents formed by the separation of the coarse solids from the slurry. Additionally, the introduction of the slurry can have a detrimental effect on the underwash layer, with swirling and vortices created in the gravity separation vessel by the introduction of the slurry affecting the stability of the underwash layer and causing an erosion of the underwash layer.

SUMMARY OF THE INVENTION

In a first aspect, a feedwell for use in a gravity separation vessel which provides more uniform distribution in the vessel as the influent stream enters the vessel for separation is provided. The feedwell comprises: a walled member having an upper perimeter edge, a lower perimeter edge and a substantially continuous wall extending from the upper perimeter edge to the lower perimeter edge; an inlet for introducing a feed stream such as oil sand slurry into the walled member positioned adjacent the substantially continuous wall; and a bottom floor having an opening and extending generally beneath the lower perimeter edge; whereby a perimeter of the opening is less than a perimeter of the walled member. In one embodiment, the feedwell further comprising a deflector plate having a generally conical shape and spacedly position beneath the opening of the bottom floor.

In one embodiment, the substantially continuous wall defines a substantially cylindrical space and the opening in the bottom floor is positioned substantially centrally and is substantially circular in shape having a diameter that is smaller than the inner diameter of the walled member. Thus, the feed stream level in the walled member will increase, providing a pool in the chamber into which the kinetic energy from the inlet feed stream flow can be dissipated. Hence, the opening in the bottom floor is sized to maintain the liquid pool level in the cylindrical space of the feedwell.

In another embodiment, the feedwell further comprises an extension pipe attached to the opening to divert the flow of the feed stream from the opening directly onto the center or apex of the conical deflector plate. The extension pipe favors an axisymmetric down-flow which impacts onto the apex producing a circumferentially uniform discharge. It is understood that the opening must be of a sufficient size to allow the passage of the entire feed stream, including any lumps that may be present therein.

In another embodiment, the feedwell further comprises at least one substantially vertical baffle located within the walled member for reducing the momentum of the feed stream as it enters the walled member. In one embodiment, the width of the baffles may increase in the rotation direction as you move away from the inlet with the thinnest baffle position directly in line with the feed stream inlet, thus, preventing excessive erosion of the baffles located closest to the feed inlet point. It is understood that baffles can be different shapes as known in the art, for example, L shaped baffles can be used.

In another aspect, a feedwell for a gravity separation tank for introducing a slurry to the gravity separation vessel is provided. The feedwell comprises: a walled member having an upper perimeter edge, a lower perimeter edge and a substantially continuous wall extending from the upper perimeter edge to the lower perimeter edge; an inlet for introducing a feed stream into the walled member positioned adjacent the substantially continuous wall; a bottom plate having a first opening extending generally beneath the lower perimeter edge; a first deflector plate having a second opening and a generally frusto-conical shape and positioned beneath the first opening such that the feed is directed from the first opening to the second opening of the first deflector plate; and a second deflector plate having a generally conical shape and spacedly positioned below the first deflector plate so that when the feed goes through the second opening it is distributed between the two deflector plates.

It is understood that the space between the first and second deflector plates should be sufficient to allow any large lumps in the feed stream to pass therebetween. For example, when the feed is oil sand slurry, it is possible to have lumps therein having a diameter of about 2 to 4 inches. In one embodiment, the first and second deflector plates are substantially parallel. However, it is understood that the plates can be either convergent or divergent, provided, however, that the narrowest space between the plates is sufficient to allow the passage of the largest lumps in the feed stream therebetween.

In another aspect, a gravity separation vessel is provided. The gravity separation vessel has a separation chamber for holding slurry to be separated, an underwash pipe for supplying heated liquid to the separation chamber, the underwash pipe extending into the separation chamber, at least one underwash outlet connected to the underwash pipe at a predetermined height in the separation chamber and operative to route heated liquid from the underwash pipe to the separation chamber and a feedwell for supplying slurry to the gravity separation vessel. The feedwell has a walled member having an upper perimeter edge, a lower perimeter edge and a substantially continuous wall extending from the upper perimeter edge to the lower perimeter edge; an inlet for introducing a feed stream into the walled member adjacent the substantially continuous wall; a bottom plate having an opening extending generally beneath the lower perimeter edge; and a deflector plate having a generally conical shape and spacedly positioned beneath the central opening of the bottom plate. The feedwell is positioned so that the outer periphery of the deflector plate is positioned below the underwash outlet(s).

In another aspect, a gravity separation vessel is provided. The gravity separation vessel has a separation chamber for holding slurry to be separated, an underwash pipe for supplying heated liquid to the separation chamber, the underwash pipe extending into the separation chamber, at least one underwash outlet connected to the underwash pipe at a predetermined height in the separation chamber and operative to route heated liquid from the underwash pipe to the separation chamber and a feedwell for supplying slurry to the gravity separation vessel. The feedwell has a walled member having an upper perimeter edge, a lower perimeter edge and a substantially continuous wall extending from the upper perimeter edge to the lower perimeter edge; an inlet for introducing a feed stream into the walled member adjacent the substantially continuous wall; a bottom plate having a central opening extending generally beneath the lower perimeter edge; a first deflector plate having a generally frusto-conical shape and positioned beneath the central opening such that the feed is directed through the opening of the first deflector plate; and a second deflector plate having a generally conical shape and spacedly positioned below the first deflector plate so that the feed is distributed between the two deflector. The feedwell is positioned so that the outer periphery of the lower deflector plate is positioned below the underwash outlet(s).

In another aspect, a method for introducing a slurry comprising oil sand and water to a gravity separation vessel is provided. The method comprises: providing the slurry to a feedwell; passing the slurry though a chamber of the feedwell; and discharging the slurry from the chamber of the feedwell through a deflector assembly by first routing the slurry downwards and outwards through the deflector assembly and then routing the slurry substantially horizontally outwards from the deflector assembly into the gravity separation vessel.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the following figures. It is understood that the drawings provided herein are for illustration purposes only and are not necessarily drawn to scale.

DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Figure 1:
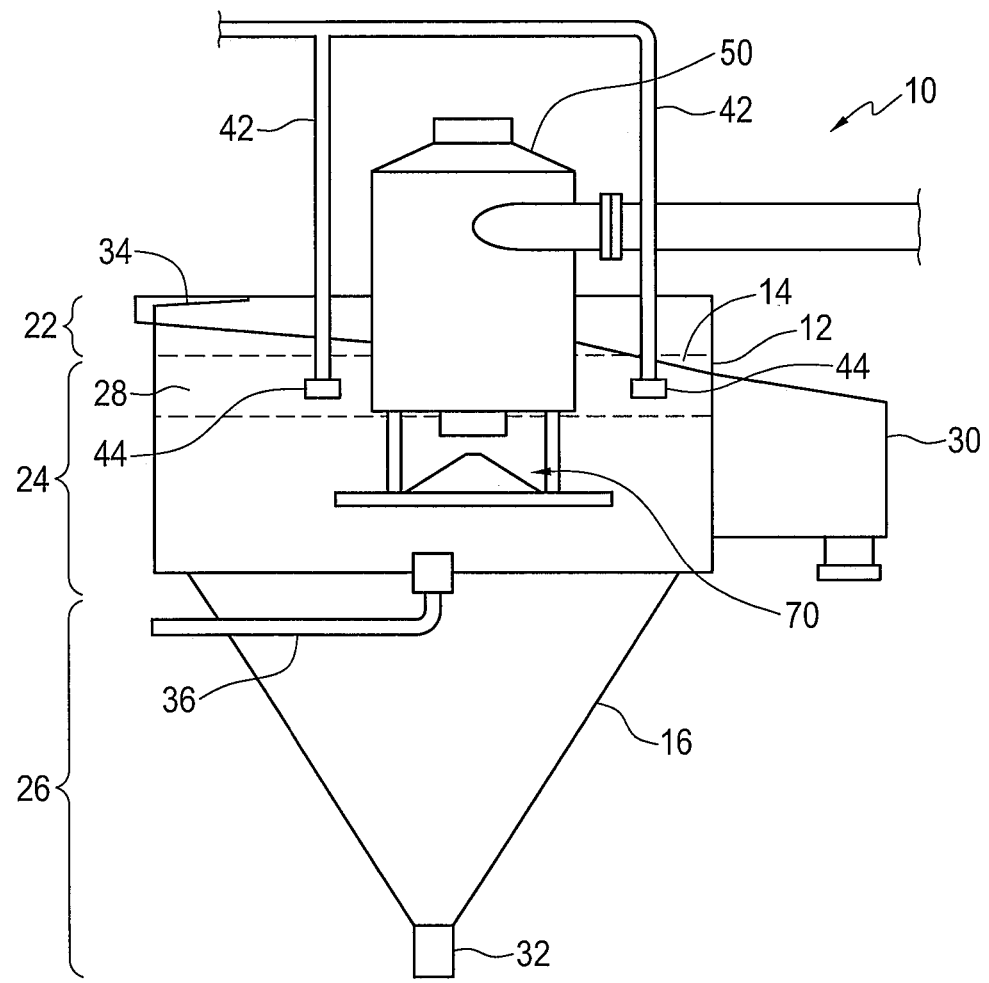
FIG. 1 is a schematic side illustration of a gravity separation vessel.

FIG. 1 illustrates a gravity separation vessel 10 such as a primary separation vessel (PSV) for use in extracting bitumen from an oil sand/water slurry. Diluted oil sand/water slurry (which has typically been conditioned by hydrotransport through pipelines) is introduced into the gravity separation vessel 10 and, under quiescent conditions, the bitumen froth separates from the water and solids. Typically, the gravity separation vessel 10 is operated as a continuous process so that diluted slurry is continuously being introduced into the gravity separation vessel 10 while end products, such as bitumen froth, a tailings stream, etc. are also being continuously removed.

The gravity separation vessel 10 has a separation chamber 12. Typically, the separation chamber 12 will have a generally cylindrical upper portion 14 and a generally conical bottom portion 16. The upper portion 14 can have an open top and a feedwell 50 provided in the upper portion through which the diluted slurry enters the gravity separation vessel 10 at the upper portion 14 of the separation chamber 12.

The diluted slurry, once introduced into the separation chamber 12, forms a number of layers in the separation chamber 12; including a bitumen froth layer 22 at the top of the separation chamber 12, a middlings layer 24 below the bitumen froth layer 22 and a tailings layer 26 at a bottom of the separation chamber 12.

Typically, the froth layer 22 contains a significant portion of bitumen and lesser portions of water and solids mixed together in an air containing froth. The specific amount of bitumen, water and solids will depend on the quality of the mined oil sand, such as its bitumen content, fines content, etc and the process conditions. The froth layer 22 is formed by the quiescent conditions in the gravity separation vessel 10 where the aerated bitumen floats to the surface of the liquid in the gravity separation vessel 10, forming the froth layer 22. The middlings layer 24 is typically in a liquid/watery form and contains bitumen, water and suspended solids and is positioned below the froth layer 22 in the gravity separation vessel 10. The tailings layer 26 is located at the bottom of the gravity separation vessel 10 and typically contains a majority of sand which has settled out of the liquid in the gravity separation vessel 10 and has sunk towards the bottom of the gravity separation vessel 10.

The froth layer 22 in the gravity separation vessel 10 can be recovered and routed for further treatment, such as de-aeration, addition of a diluent to form diluted bitumen, etc., so that the recovered bitumen can be further upgraded to a petroleum product. In one aspect, the froth layer 22 can be recovered by allowing it to overflow a top lip 34 of the gravity separation vessel 10 whereby this overflow of bitumen froth can be collected in a launder 30 and conveyed away for further treatment.

The middlings layer 24 can also be removed from the gravity separation vessel 10, such as by pipe 36, and further treated to recover at least some of the bitumen that has remained in the middlings layer 24.

The tailings layer 26 containing sand and other solids that have settled out of the liquid in the gravity separation vessel 10 can be removed from the gravity separation vessel 10 as a tailings stream, such as through a bottom outlet 32. The tailings stream can either be discarded or further treated to remove additional bitumen that may be present in the tailings stream.

An underwash layer 28 can be formed at the interface of the middlings layer 24 and bitumen froth layer 22. The underwash layer 28 can be formed by introducing heated liquid, such as water, into the middlings layer 24, such as by use of a froth underwash pipe 42 extending down into separation chamber 12 and having outlets 44 for injecting the heated liquid in the separation chamber 12 to form the underwash layer 28 above the middlings layer 24. It is preferred that the underwash layer be preserved, i.e., remain essentially unperturbed, and some of the feedwell embodiments of the present invention have been designed so that there less interference with the underwash layer.

Figure 2:
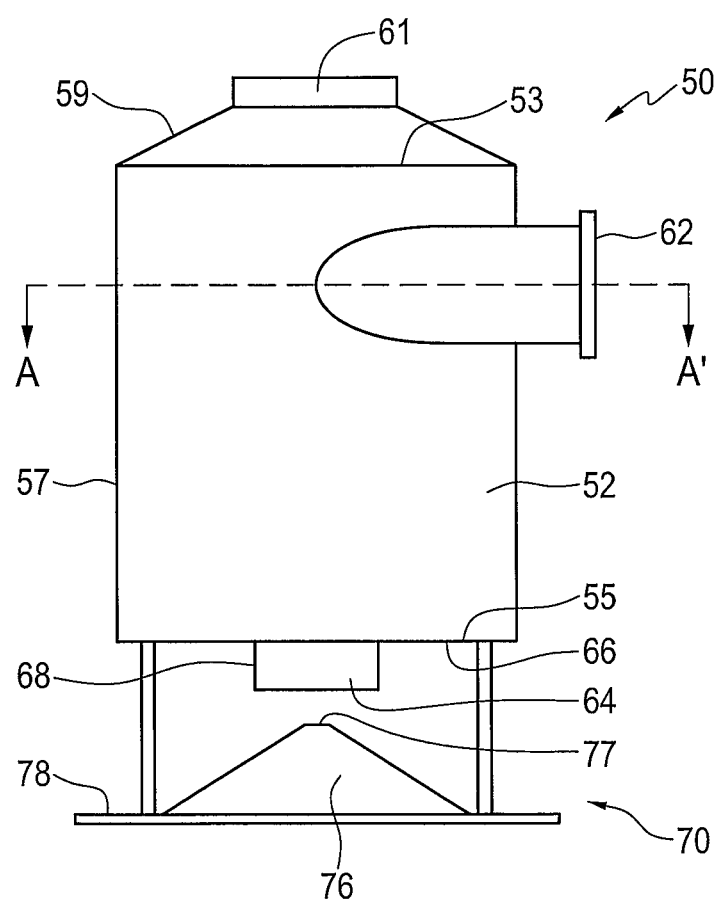
FIG. 2 is a side view of a feedwell for introducing slurry to a gravity separation vessel.
Figure 3:
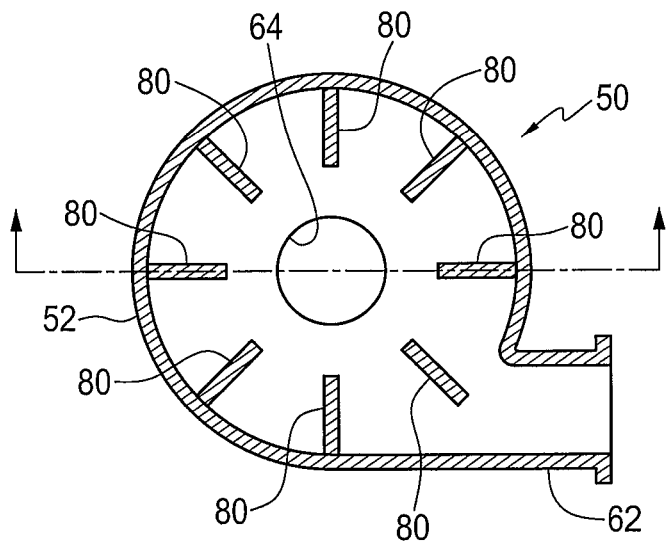
FIG. 3 is a sectional top view of the feedwell of FIG. 2 along line AA'.
Figure 4:
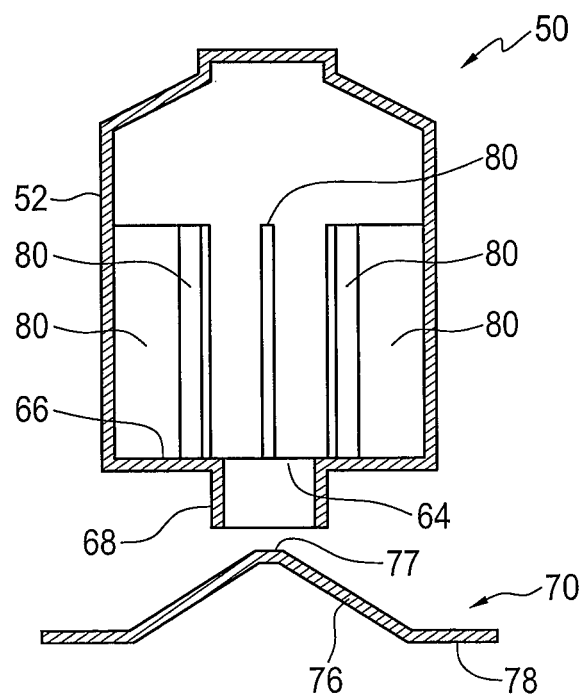
FIG. 4 is a schematic side sectional view of the feedwell of FIG. 2.

FIGS. 2 through 4 illustrate the feedwell 50. The feedwell 50 comprises walled member 52 having an upper perimeter 53, a lower perimeter 55 and a substantially continuous wall 57 with an inlet 62 provided on an upper portion of the walled member 52. The inlet 62 is provided so that it is oriented tangentially to the continuous wall 57 causing the slurry that is introduced into the feedwell 50 to be introduced into the walled member 52 of the feedwell 50 in a direction substantially tangential to the continuous wall 57.

Bottom floor 66 of the walled member 52 of the feedwell 50 has an opening 64 which can have an extension pipe 68 extending therefrom. The opening 64 can be positioned in the center of the bottom plate 66 of the walled member 52 and can be sized so that it constrains the amount of slurry exiting the feedwell 50. In one embodiment, the opening 64 has a substantially smaller area than the area of the bottom floor 66. By sizing the opening 64 based on the flow rate that will be used for the slurry entering the feedwell 50 through the inlet 62, the feedwell 50 can be designed so that a desired level of slurry can be maintained in the feedwell 50. If an extension pipe 68 is provided, the extension pipe 68 can help to cause a uniform axisymmetric down-flow in the slurry exiting the walled member 52 through the opening 64

In one aspect, a number of baffles 80 can be provided in the walled member 52 of the feedwell 50 to prevent or minimize swirling flows and/or vortices in the slurry. In one aspect, the baffles 80 can be positioned so that the baffles are oriented radially from the center of the feedwell 50. The baffles 80 can extend from the walls of the walled member 52 of the feedwell 50 partially towards the center of the feedwell 50 and the width of the baffles may increase in the rotation direction as you move away from the inlet with the thinnest baffle position directly in line with the feed stream inlet, thus, preventing excessive erosion of the baffles located closest to the feed inlet point.

A deflector assembly 70 can be provided below the opening 64 in the bottom floor 66. The deflection assembly 70 can have a deflector plate 76 positioned spaced below the opening 64 in the bottom floor 66. In one aspect, the deflector plate 76 can be generally conically-shaped with a apex 77 of the deflector plate 76 positioned spacedly below the opening 64 in the bottom plate 66 so that slurry discharged out of the chamber 52 of the feedwell 50 is deflected by the apex 77 of the deflector plate 76 to follow the downward slant of the deflector plate 76. A substantially horizontal periphery portion 78 of the deflector plate 76 can extend outwards to attempt to redirect the flow of slurry exiting the feedwell 50 horizontally. As slurry is discharged downwards out of the opening 64 in the bottom floor 66 towards the generally conically-shaped deflector plate 76, the deflector plate 76 can redirect at least some of the flow of slurry downwards and outwards along its length. As the flow of slurry reaches the periphery portion 78, the substantially horizontal periphery portion 78 can attempt to direct this flow substantially horizontally and outwards.

The feedwell 50 may further have a lid 59 at the upper perimeter edge 53 having an opening 61, to prevent the slurry feed from splashing out while still allowing venting.

Referring to FIGS. 1 through 4, the feedwell 50 is positioned relative to the separation chamber 12 of the gravity separation vessel 10 such that the inlet 62 of the feedwell 50 is positioned above the top of the separation chamber 12 allowing the slurry to be routed to the inlet 62 and thereby into the chamber 52 of the feedwell 50. The chamber 52 of the feedwell 50 can extend downwards into the separation chamber 12 so that the deflection assembly 70 is extending into the middlings layer 24 with the outer periphery 78 of the deflector plate 76 positioned in the middlings layer 24 substantially below the underwash layer 28.

For example, in one aspect the outlets 44 of the froth underwash pipe 42 extend approximately 1.5 meters from the top of the separation chamber 12 of the gravity separation vessel 10 while the bottom of the extension pipe 68 on the feedwell 50 extends approximate 2.2 meters below the top of the chamber 12 of the gravity separation vessel 10 and the dilute slurry entering the chamber 12 of the gravity separation vessel 10 as it passes the deflector plate 76 enters the separation chamber 12 at approximately 3.5 meters below a top of the separation chamber 12 of the gravity separation vessel 10.

In operation, diluted slurry is introduced into the gravity separation vessel 10 by first introducing the diluted slurry into the inlet 62 of the feedwell 50. The tangential orientation of the inlet 62 can cause a swirling/vortex motion in the slurry in the chamber 52 of the feedwell 50. If baffles 80 are provided in the walled member 52 of the feedwell 50, the baffles 80 can act on the slurry to reduce the swirling of the slurry. As the slurry in the walled member 52 moves towards the bottom plate 66, slurry closer to the center of the walled member 52 of the feedwell 50 can pass downwards through the opening 64 in the bottom plate 66 of the walled member 52, where less swirling may be present.

As the slurry passes through and out of the walled member 52 of the feedwell 50, some of the flow of slurry can contact the apex 77 of the deflector plate 76 and be directed downwards and outwards along the deflector plate 76. As the slurry exits past the outer periphery 78 of the bottom plate 76, at least some of the flow of slurry is directed substantially horizontally out into the separation chamber 12 of the gravity separation vessel 10 into the middlings layer 24 and beneath the underwash layer 28.

Figure 5:
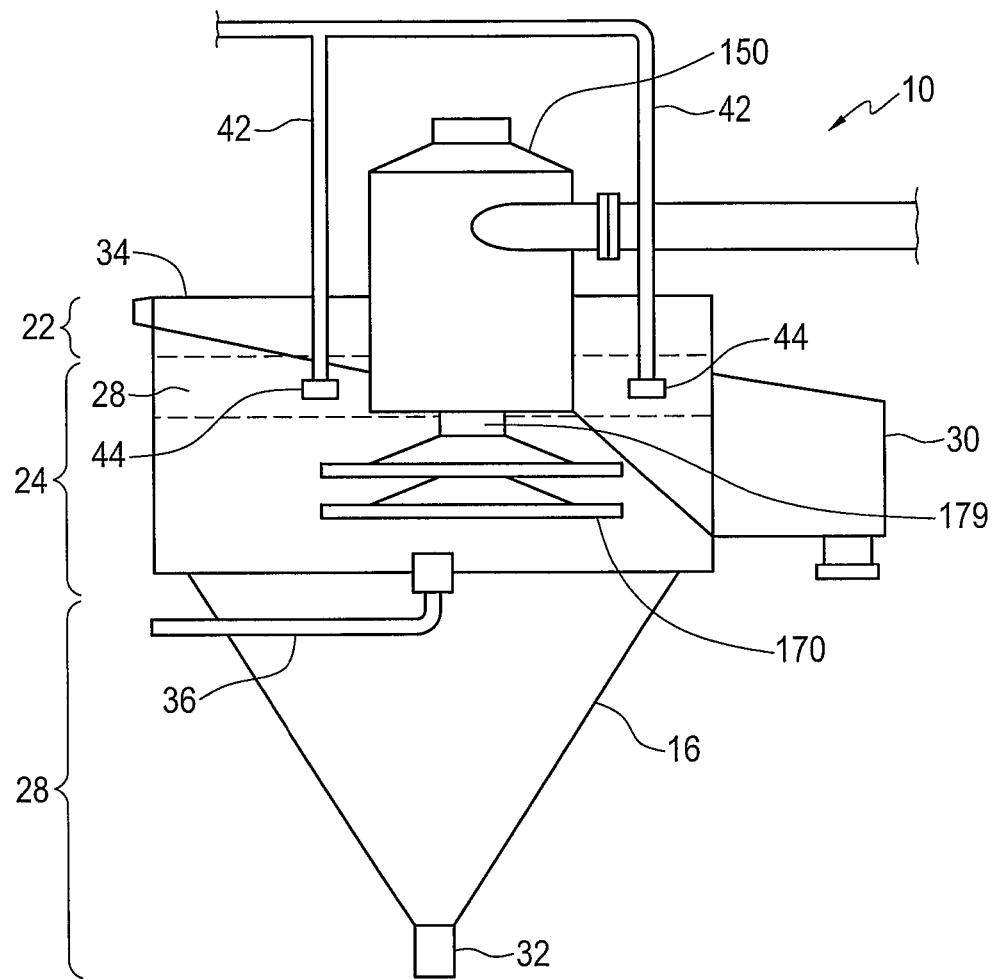
FIG. 5 is schematic side illustration of a gravity separation vessel in another aspect.
Figure 6:
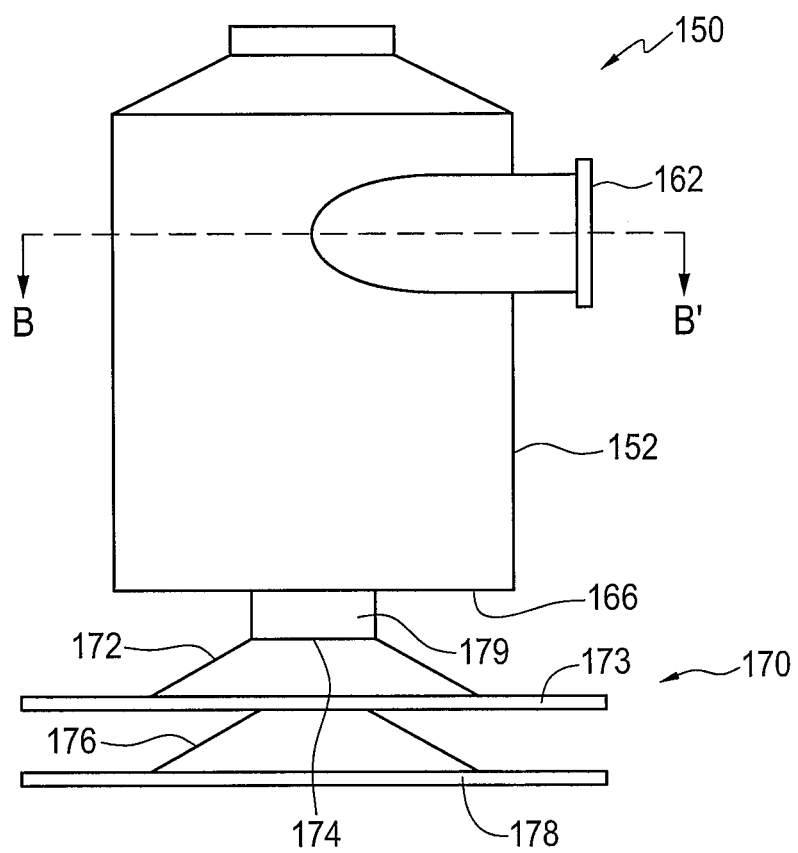
FIG. 6 is a side view of a feedwell used in the gravity separation vessel shown in FIG. 5.
Figure 7:
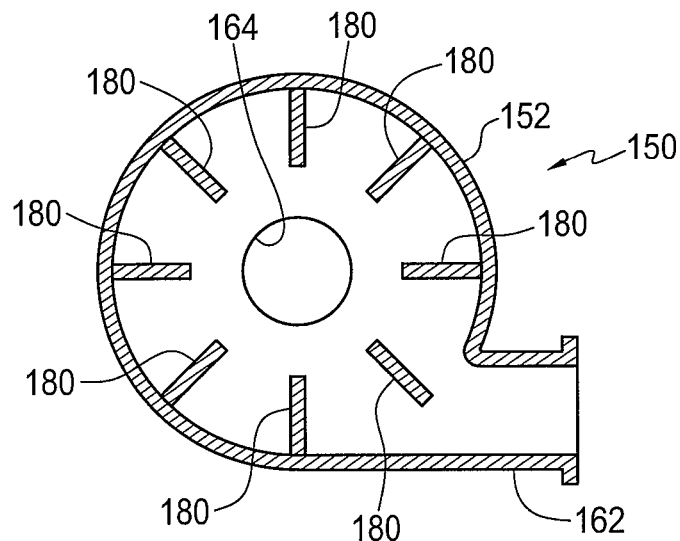
FIG. 7 is a sectional top view of the feedwell of FIG. 6 along line BB'.
Figure 8:
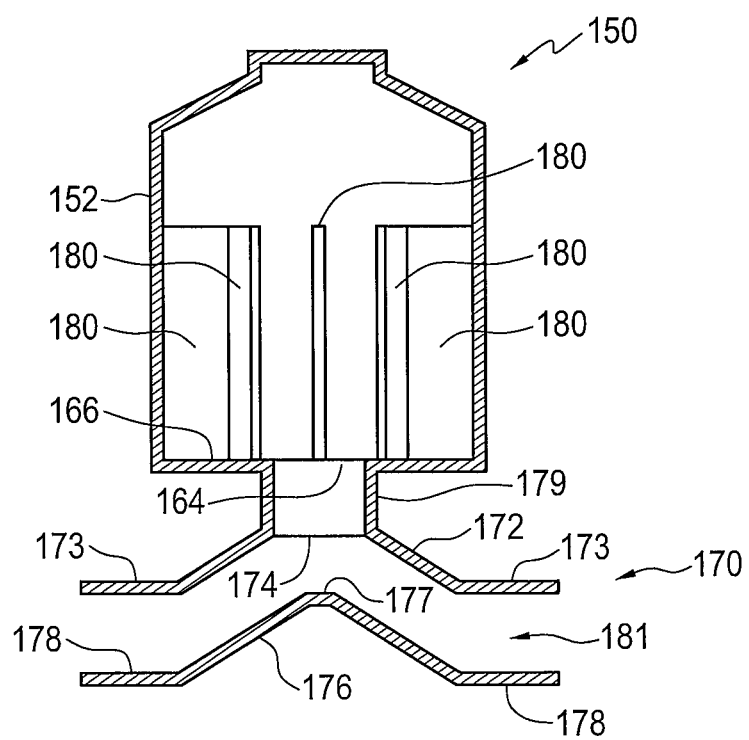
FIG. 8 is a schematic side sectional view of the feedwell of FIG. 6.

FIG. 5 illustrates the separation vessel 10 using a feedwell 150 to introduce slurry into the separation chamber 12 of the separation vessel 10 in a further aspect. FIGS. 6 through 8 illustrate the feedwell 150. The feed well 150 can have a walled member 152 with a tangentially oriented inlet 162 provided on an upper portion of the walled member 152. An opening 164 can be provided on a bottom floor 166 of the chamber 152 of the feedwell 150. The opening 164 can have an extension pipe 179 extending downwards therefrom and can be positioned in the center of the bottom floor 166. The opening 164 can be sized so that it constrains the amount of slurry exiting the feedwell 150 to keep a desired level of slurry in the walled member 152 of the feedwell 150.

In one aspect, a number of baffles 180 can be provided in the walled member 152 to reduce swirling of slurry in the walled member 152 of the feedwell 150.

A deflector assembly 170 can be provided below the opening 164 in the bottom floor 166. The deflection assembly 170 can have a first deflector plate 172 and a second deflector plate 176. In one aspect, the first deflector plate 172 has a generally frusto-conical shape and an opening 174, which opening 174 is positioned immediately below opening 164 of the bottom floor 166. In one embodiment, the opening 174 is connected to opening 164 by an extension pipe 179. The second deflector plate 176 can be generally conically-shaped with a apex 177 of the deflector plate 176 positioned spacedly below the opening 174 of the first deflector plate 172 so that slurry discharged out of the walled member 152 flows in between the space formed between the two deflector plates 172 and 176. Thus, the feed is deflected by the apex 177 of the second deflector plate 176 to follow the downward slant of the second deflector plate 176. A substantially horizontal periphery portion 178 of the second deflector plate 176 can extend outwards to attempt to redirect the flow of slurry exiting the feedwell 150 horizontally. A similar substantially horizontal periphery portion 173 may extend from the first deflector plate 172.

Thus, the first deflector plate 172 and the second deflector plate 176 can act in conjunction to direct at least a substantial portion of the flow of slurry entering the separation chamber 12 from the feedwell 150 outwards into the separation chamber 12 in a substantially horizontal direction beneath the underwash layer 28. The substantially horizontal orientation of the flow of slurry entering the separation chamber 12 from the channel 181 formed between the first deflector plate 172 and the second deflector plate 176 is oriented below the bottom of the underwash layer 28 to prevent the incoming slurry from eroding the hot liquid forming the underwash layer 28.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. A feedwell for a gravity separation vessel for introducing a feed stream such as oil sand slurry to the gravity separation vessel, the feedwell comprising:
   a walled member having an upper perimeter edge, a lower perimeter edge and a substantially continuous wall extending from the upper perimeter edge to the lower perimeter edge;
   an inlet for introducing a feed stream into the walled member positioned adjacent the substantially continuous wall;
   a bottom plate having a first opening and extending generally beneath the lower perimeter edge;
   a first deflector plate having a generally frusto-conical shape, a substantially horizontal periphery and a second opening, the first deflector plate positioned beneath the first opening such that the feed is directed from the first opening to the second opening; and
   a second deflector plate having a generally conical shape, a substantially horizontal periphery and spacedly positioned below the first deflector plate so that when the feed goes through the second opening it is distributed between the two deflector plates;
   wherein the first deflector plate is substantially parallel to the second deflector plate.

2. The feedwell of claim 1 wherein the first deflector plate is connected to the first opening by an extension pipe extending from the second opening.

3. The feedwell of claim 1 further comprising at least one baffle in the walled member.

4. The feedwell of claim 1, wherein the first opening is positioned substantially centrally in the bottom floor.

5. The feedwell of claim 1, wherein the second opening is positioned substantially centrally in the first deflector plate.

6. A feedwell for a gravity separation vessel for introducing a feed stream such as oil sand slurry to the gravity separation vessel, the feedwell comprising:
   a generally planar bottom portion having a first opening;
   an annular transition portion extending upwardly from the generally planar bottom portion;
   a sidewall portion extending upwardly from the annular transition portion;
   a tangential inlet for introducing the feed stream into the feedwell abutting the sidewall portion;
   a first deflector plate having a generally frusto-conical shape and a second opening, the first deflector plate positioned beneath the first opening such that the feed is directed from the first opening through the second opening;

a second deflector plate having a generally conical shape and spacedly positioned below the first deflector plate; and an extension pipe connecting the first opening with the second opening so that the feed goes through the extension pipe and is distributed between the two deflector plates.

7. The feedwell of claim 6 wherein the first deflector plate is substantially parallel to the second deflector plate.

8. The feedwell of claim 7 wherein the first deflector plate has a substantially horizontal periphery and the second deflector plate has a substantially horizontal periphery.

9. The feedwell of claim 6 further comprising at least one baffle in the sidewall portion.

10. The feedwell of claim 6, wherein the first opening is positioned substantially centrally in the bottom portion.

11. The feedwell of claim 6, wherein the second opening is positioned substantially centrally in the first deflector plate.

\* \* \* \* \*